June 24, 1958 — A. E. WISELKA — 2,839,803
LINE-LURE FASTENER
Filed Oct. 16, 1953
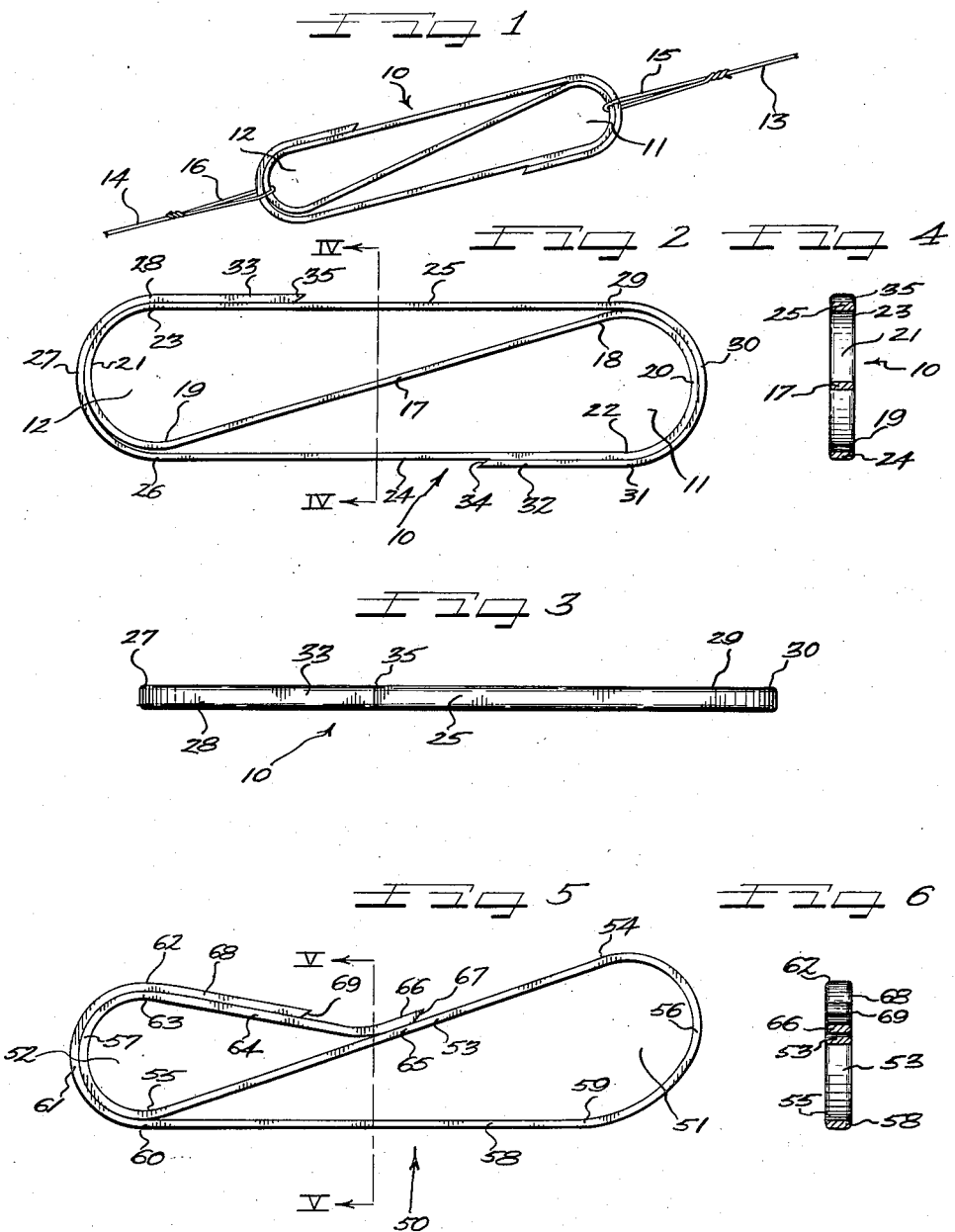
Inventor
Albert E. Wiselka

United States Patent Office 2,839,803
Patented June 24, 1958

2,839,803

LINE-LURE FASTENER

Albert E. Wiselka, Sheridan, Wyo.

Application October 16, 1953, Serial No. 386,469

5 Claims. (Cl. 24—73)

The present invention relates to a line-lure fastener and more particularly to a closed loop double end link or tie member for releasably securing articles of fishing tackle and the like to lines therefor.

It is a principal object of the present invention to provide a new and improved fastener as an article of fishing tackle or the like adapted to securely link the tow-line or the like to the lure-line or the like or to securely link a trotline or the like to snelled hooks or the like yet permitting quick and easy decoupling or disconnection between these members.

Although there have been numerous devices of this class developed in the prior art, the heretofore known devices have enjoyed more or less success and they have been accepted by anglers some more readily than others. Anglers' requirements for a securing link which permits quick and easy separation of the members secured thereto have, nevertheless, remained continuously asserted.

Another principal object of this invention is to satisfy this requirement.

It is, therefore, an important object of the present invention to provide a new and improved closed loop double end link or tie member to securely link articles of fishing tackle together yet permitting simple removability thereof as in the case where the hook is deeply imbedded in the catch. In such a case the leader or snelled hook may be readily removed from the link with a minimum of effort and a new snelled hook or hook with a leader fastened onto the link whereby the sport may be continued and the deeply imbedded hook may be removed at a more convenient time.

Still another object of the present invention is to provide a new and improved fastener or link member of the class described formed from an elongated member having reverse folds therein.

Still another object of the present invention is to provide a new and improved closed loop double end link or tie member having an S curve therein with the ends folded over to overlap other portions of the member thereby forming closed loop ends.

Still another object of the present invention is to provide a new and improved closed loop double end link or tie member formed of resilient material and having such reverse folds therein as to provide eyelet loops therein and an overlapping portion of the material forming the loops to provide end portions of increased strength.

Still other objects, features and advantages of the present invention will become readily apparent from the following detailed description, from the claims and from the accompanying drawings which illustrate a preferred embodiment of the present invention and which fully and completely disclose each and every detail as shown thereon, in which like reference numerals refer to like parts and in which:

Figure 1 is an elevational view of a preferred embodiment of the present invention and further illustrates the manner of linking lines or snelled members or the like thereto in accordance with the principles of the present invention;

Figure 2 is an enlarged elevational view of the embodiment of the present invention illustrated in Figure 1;

Figure 3 is an enlarged plan view of the fastener illustrated in Figures 1 and 2;

Figure 4 is an enlarged sectional view of the fastener illustrated in Figures 1, 2 and 3 and is taken substantially along the line IV—IV of Figure 2;

Figure 5 is an enlarged elevational view of another embodiment of the present invention; and Figure 6 is a sectional view of the fastener of Figure 5 and taken substantially along the line V—V thereof.

Line-lure fasteners embodying the principles of the present invention provide coupling links which have a very economical and simple construction, yet are most durable and easy to use in addition to having any desired weight characteristics. For example, line-lure fasteners embodying the principles of the present invention may be made so light that when used to couple a dry fly to a fly line, they will not sink even the lightest dry flies. On the other hand, line-lure fasteners embodying the principles of the present invention may be made sufficiently heavy to operate as sinkers or the like if that is so desired. The size and weight of line-lure fasteners embodying the principles of the present invention is variable to any desired limits.

A first preferred form of line-lure fastener embodying the principles of the present invention is illustrated completely in detail in Figures 1 through 4 wherein the line-lure fastener 10 is illustrated as a closed loop double end link or tie member having closed loops 11 and 12 at its ends. In Figure 1 it is shown that the line-lure fastener 10 readily securely couples a towline or fly line or trotline or the like 13 to a lure or another portion of another line or a leader or a hook or the like 14 by having the snelled ends of the respective members 13 and 14, as indicated generally at 15 and 16 respectively, affixed through the looped ends 11 and 12, respectively, of the fastener or link 10.

The fastener or link 10 is formed from a length or an elongated strip of preferably resilient material such as wire, or any desired characteristics, or metallic strip, or plastic strip, or other formable or otherwise bendable material. The elongated material member is provided with a reverse fold or an S fold therein with a preferably substantially straight intermediate section 17 between the points of inflection 18 and 19 of the reverse folded or bight portions 20 and 21, respectively, of the S fold. The reverse fold or S fold or bend or the like may be provided by bending or casting or the like depending upon the character of the material which may or may not be heated or the like as in the case of thermal plastic materials to effect the bending thereof.

Considering the points of inflection 18 and 19 of the bight portions 20 and 21 as being the inside points of inflection, the outside points of inflection 22 and 23 for the looped ends 20 and 21, respectively, terminate the looped ends 20 and 21 in a substantially semi-circular form. That is, the looped ends 20 and 21 are substantially semi-circular and bounded by points of inflection 18—22 and 19—23, respectively.

The elongated member forming the link 10 has substantially straight portions 24 and 25 which continue from the points of inflection 22 and 23, respectively, and each of which has a length substantially equal to the distance between the points 22—19 and the points 23—18, respectively. These straight portions 24 and 25 are substantially parallel to each other and lie in substantially the same plane together with the intermediate section 17.

In the vicinity of the inflection point 19, the straight leg 24 is bent or the like from an inflection point 26 to have a curved loop end 27 which is substantially semicircular and which has an inside radius substantially equal to the outside radius of the curved loop section 21 so that it lies substantially flush thereagainst and is substantially contiguous therewith to a second inflection point 28 therefor which is substantially adjacent to the inflection point 23.

The straight leg 25 similarly is bent from an inflection point 29, which is adjacent to the point of inflection 18, so that it has a reinforcing loop semi-circular bent or the like section 30 of substantially semi-circular configuration and terminating in a second inflection point 31 which is adjacent to the point of inflection 22 for the S curve looped end 20. The curved or folded or bent end or the like 30 also is substantially contiguous with the portion 20 and has an inside radius which is substantially equal to the outside radius of the curved end 20.

The member forming the link or tie 10 has terminalled ends or tips 32 and 33 which overlap portions of the straight legs 24 and 25, respectively, and are so tapered at their ends 34 and 35 as to taper outwardly from the legs 24 and 25 substantially in the direction of the looped ends 12 and 11, respectively. That is, the tapered end 34 of the tip portion 32 is tapered in such a direction as to point outwardly and away from the overlap region between the tip 32 and the leg 24. The tapered end 35 is similarly so configurated.

By the configuration described for this closed loop double end link or tie member 10 and the elongated member from which it is formed, there is provided overlapped portions in the regions of the closed looped ends 11 and 12 which provide reinforcing strength to the overlapped or looped end areas of the link 10. It is against these overlapped areas as at 20—30 and 21—27 that the pull from the lines or light articles of fishing tackle 13 and 14 exert their forces through the snelled ends 15 and 16 thereof (Figure 1). To prevent wear or the like on the lines and to prevent the same from fraying, or breaking or tearing or being cut, the edges of the elongated members are "rounded-off" or tapered or the like when the member is formed from cut strips or strip material or the like. This rounding or tapering of the edges or chamfering thereof is most readily observable in the cross-sectional views of the legs 24 and 25 and of the intermediate leg 17, as viewed in Figure 4. Of course, if the link or tie member 10 is formed from round stock such as wire or the like, the edges thereof will inherently be round.

Fastening of the snelled ends of a broken line or the like or of a tow-line or trotline or the like, or of a snelled hook or leader or lure or the like by means of the link or fastener member 10 is a simple and speedy operation which requires only the minimum of effort and time. The snelled ends or looped ends of the lines or the like to be linked by the member 10 embodying the principles of the present invention are merely hooked under the tapered ends 34 and 35, respectively, and pulled between the overlapping areas of the closed loop reverse folded ends until they fall into the closed loop regions 11 and 12. That is, one of the snelled ends, such as the snelled end 15 of the fishing tackle member 13, is hooked under the tapered end 35 and pulled between the overlapping regions of the tip 33 and leg 35, and of the looped portions or folded or bent portions 27 and 21, past the points of inflection 19 and 26 to be secured within the looped end 11. In a similar manner, the snelled end 16 of the angling member 14 is hooked under the tapered end 34 and pulled between the overlapping members in the closed loop end 11 until it falls into the closed loop at the end 12. The simple matter of reversing this procedure for either or both of the described members having the snelled ends 15 and 16 operates to effectively quickly and easily remove either or both of the same from the closed loop double end link or tie member 10.

The advantages and features hereinabove described for the embodiment of the present invention illustrated in Figures 1 through 4 are also incorporated into the embodiment illustrated in Figures 5 and 6 wherein a double end closed loop link or tie member 50 is provided with closed loop ends 51 and 52 by effecting a reverse fold or S shaped bend or the like in an elongated member having preferably substantially the same characteristics as those described for the elongated member from which the link or the like 10 may be formed.

In this second preferred embodiment of the present invention the intermediate leg 53 adjoins the points of inflection 54 and 55 for the "inside" ends of the bight portions 56 and 57 of the S curved areas or reverse folded areas of the closed loop link or tie 50. In this embodiment of the present invention a straight leg 58 extends from the outside point of inflection 59 of the bight of the looped end or curved end area 56 to another point of inflection 60 substantially adjacent to the inside point of inflection 55 for the bight 57 wherefrom the elongated material from which the member 50 is made or constructed is curved or bent contiguously with the bight 57, as at 61, to an inflection point 62 adjacent to the outside point of inflection 63 for the bight 57. A substantially shorter leg or the like 64 extends from the outside inflection point 63 for the bight 57 to a substantially central region of the intermediate leg 53 where it overlaps a small area thereof as at 65 and lies thereagainst. The region 65 of the intermediate leg 53 is overlapped by the terminal or tip end 66 of the leg 64 and the very tip of the terminal end 66 is tapered or the like as at 67 acutely outwardly from the intermediate leg 53.

A tip portion 68 extends from the inflection point 62 which is adjacent to the outside inflection 63 of the bight 57 and extends to a tapered end 69 while overlapping the short leg 64 and lying substantially thereagainst. The tapered ends 67 and 69 are properly angled to permit easy and quick insertion and removal of snelled loops or the like into the closed loop double-ended link 50. The tapered end 69 is disposed along the intermediate leg 64 so that the tip 68 does not extend beyond the tip 66, thereby permitting efficient insertion or removal of either or both etc. of the snelled ends or the like to be linked by the link member 50.

It will be readily observed that the embodiment of the invention illustrated in Figures 5 and 6 is also adapted for efficient linking in the manner described above for the embodiment of the invention illustrated in Figures 1 through 4 and it will not unduly wear or cut or the like the members linked thereby since its edges are rounded off or chamfered or the like as illustrated in the cross-sectional view of Figure 6.

It will also be observed that numerous modifications and variations of those quick connect and disconnect members embodying the principles of the present invention are subject to numerous modifications and variations without departing from the true spirit and scope of the novel concepts of the principles of the present invention. I, therefore, intend to cover all such modifications and variations as fall within the scope of the novel concepts and the principles of my invention.

I claim as my invention:

1. A closed loop double-end link to securely and removably link together a plurality of looped end articles comprising, an elongated member of resilient material, an S fold in said member having opposed loops, and end portions of said member wrapped around the bight portions of said loops to form closed loops.

2. A closed loop double-end link to securely and removably link together a plurality of looped end articles comprising, an elongated member of resilient material, an S fold in said member having opposed loops, and end portions of said member wrapped around other portions of said member to form closed loops, one of said other portions being between points of inflection of a loop and another of said other portions being a bight portion of a loop.

3. A closed loop double-end link to securely and removably link together a plurality of looped end articles comprising, an elongated member of resilient material, a first loop fold in said member, an opposed reverse loop fold in said member, a straight intermediate leg joining said folds, and a leg on said member extending from a fold and wrapped around the other fold.

4. A closed loop double-end link to securely and removably link together a plurality of looped end articles comprising, an elongated member of resilient material, a first loop fold in said member, an opposed reverse loop fold in said member, a straight intermediate leg diagonally joining said folds, and legs on said member extending respectively from said folds and each wrapped around the opposite of said folds.

5. A closed loop double-end link to securely and removably link together a plurality of looped end articles comprising, an elongated member of resilient material, a first loop fold in said member, an opposed reverse loop fold in said member, a straight intermediate leg diagonally joining said folds, and a leg on said member extending from a fold and wrapped around the other fold, and an additional leg extending from the other fold and wrapped around the first-mentioned fold.

References Cited in the file of this patent

UNITED STATES PATENTS

| | | |
|---|---|---|
| 351,941 | Simmons | Nov. 2, 1886 |
| 1,095,247 | Toce | May 5, 1914 |
| 1,367,640 | Todd | Feb. 8, 1921 |
| 1,440,628 | Raub | Jan. 2, 1923 |
| 1,567,851 | Lorber | Dec. 29, 1925 |
| 2,116,238 | Harvey | May 3, 1938 |
| 2,601,709 | Reichardt | July 1, 1952 |

FOREIGN PATENTS

| | | |
|---|---|---|
| 359,970 | Germany | Sept. 28, 1922 |